United States Patent [19]

Rubechini

[11] Patent Number: 4,792,804

[45] Date of Patent: Dec. 20, 1988

[54] APPARATUS FOR DETECTING A BODY IN MOTION ON THE GROUND OF A PROTECTED AREA

[75] Inventor: Roberto Rubechini, Arezzo Ar, Italy

[73] Assignee: Dei-Dispositivi Elettronici Industriali Di Rubechini Roberto, Arezzo, Italy

[21] Appl. No.: 44,476

[22] Filed: May 1, 1987

[30] Foreign Application Priority Data

May 2, 1986 [IT] Italy .................................. 9385 A/86

[51] Int. Cl.⁴ ............................................ G01S 13/04
[52] U.S. Cl. ...................................... 342/27; 342/22; 342/92; 340/561
[58] Field of Search ............................. 342/22, 27–28, 342/58, 60, 91–93, 459; 340/541, 552, 553, 554, 561, 562, 567; 333/237; 343/719

[56] References Cited

U.S. PATENT DOCUMENTS

| | | | |
|---|---|---|---|
| 3,794,992 | 2/1974 | Gehman | 342/28 |
| 3,801,976 | 4/1974 | Ross et al. | 340/561 |
| 3,947,834 | 3/1976 | Gershberg et al. | 340/554 |
| 4,053,877 | 10/1977 | Torlesse et al. | 340/552 |
| 4,091,367 | 5/1978 | Harman | 340/552 |
| 4,197,537 | 4/1980 | Follen et al. | 340/554 X |
| 4,213,123 | 7/1980 | Poirier | 340/552 |
| 4,346,373 | 8/1982 | Hassman | 340/561 |
| 4,415,885 | 11/1983 | Mongeon | 340/553 X |
| 4,419,659 | 12/1983 | Harman et al. | 340/552 |
| 4,458,240 | 7/1984 | Rittenbach et al. | 340/553 X |
| 4,527,150 | 7/1985 | Porat | 340/541 |
| 4,562,428 | 12/1985 | Harman et al. | 340/553 X |
| 4,612,536 | 9/1986 | Harman | 340/552 |
| 4,710,753 | 12/1987 | Rich et al. | 340/561 |

FOREIGN PATENT DOCUMENTS

| | | | |
|---|---|---|---|
| 2557270 | 6/1977 | Fed. Rep. of Germany | 340/552 |
| 2048536 | 12/1980 | United Kingdom | 340/552 |
| 2069206 | 8/1981 | United Kingdom | 340/561 |
| 2111736 | 7/1983 | United Kingdom | 340/554 |
| 2176364 | 7/1983 | United Kingdom | 340/552 |

OTHER PUBLICATIONS

"Guidar", Control Data Corp., 12/76.
"Guidar: An Intrusion Detection System for Perimeter Protection", Harman et al; 1976.

Primary Examiner—Theodore M. Blum
Assistant Examiner—Bernarr Earl Gregory
Attorney, Agent, or Firm—Browdy and Neimark

[57] ABSTRACT

An apparatus for detecting bodies in motion on the ground of a protected area, particularly for military use and the like, wherein, by means of an antenna buried and shielded from the air, an electromagnetic signal in the range of radio frequency is radiated into the ground. Receiver means comprising means for detecting variations of the signal intensity are placed at a known distance from the receiving antenna. The intensity variation is dependent on the presence of bodies in motion within the range of action of the apparatus.

17 Claims, 1 Drawing Sheet

APPARATUS FOR DETECTING A BODY IN MOTION ON THE GROUND OF A PROTECTED AREA

DESCRIPTION

1. Field of the invention

The present invention relates to an apparatus for detecting a body in motion on the ground of a protected area, particularly suited for military requirements.

More precisely, the invention relates to an apparatus capable of perceiving and signalling the presence of a body in motion on ground of any type and structure, covered with any kind of vegetation. This apparatus can be advantageously used as a part of an alarm system designed to prevent introduction of persons or transport means in areas of military interest, as well as in particularly dangerous areas due to the presence of noxious chemicals or ionizing radiation. The apparatus can also be used for carrying out a perimeter alarm system for civilian needs around residential or factory buildings.

2. Background art

For the above mentioned purposes various systems are actually used, including acoustic, seismic and capacitive systems. The first system consists of providing a network of suitably concealed microphones for perceiving noises, amplifying and transmitting them to a remote receiver. This system is of limited reliability and selectivy because the signals are easily contaminated or at least saturated with noises which are not pertinent. Moreover the reception range is rather low. Seismic systems are based on detection of vibrations produced in the ground by a body in motion and on further transmitting them to a remote receiver. These systems involve using sophisticated apparatuses characterized by various range limits. Capacitive systems are based on the fact that, when a body is within the plates of a condenser, the capacitance of the latter is changed. Therefore, in the practice of these systems a pair of electrodes, constituting the plates, are installed on the ground; the electrodes may be formed generally of two metal wires or a metal wire and a metal net, or a pair of nets and so on. This system has the inconvenience of a very complex installation and anyway its operating range is limited to the area comprised between the plates, for which reason they are used for perimetral barriers also for civilian purposes.

SUMMARY OF THE INVENTION

The object of the present invention is to provide an apparatus for detecting a body in motion on the ground of a protected area which is free from the above mentioned inconveniences of the conventional systems and which is in particular of high reliability, operative flexibility and low cost.

According to the invention an apparatus for detecting a body in motion on the ground of a protected area is provided, comprising:
  transmitter means for transmitting radio-frequency (R.F.) electromagnetic signals, including at least a fully buried transmitting antenna, said means being shielded so as to avoid R.F. radiating in the air;
  receiver means for receiving said signals, comprising at least a receiving antenna fully shielded to the air and placed at a known distance from said transmitter means;
  automatic gain control means coupled to said receiver means for adjusting the sensitivity at an average level of the input signal;
  detector means for detecting the intensity of the received signal, driving said automatic gain control means and discriminating fast variations due to bodies moving on the ground from slow variations due to physical effects in the ground itself.

BRIEF DESCRIPTION OF THE DRAWINGS

The apparatus according to the invention is illustrated hereinafter in greater detail by reference to the following description of an exemplificative and not limitative embodiment, with reference to the accompanying drawing, in which.

DETAILED DESCRIPTION OF THE PREFERRED EMBODIMENT

Figure 1:
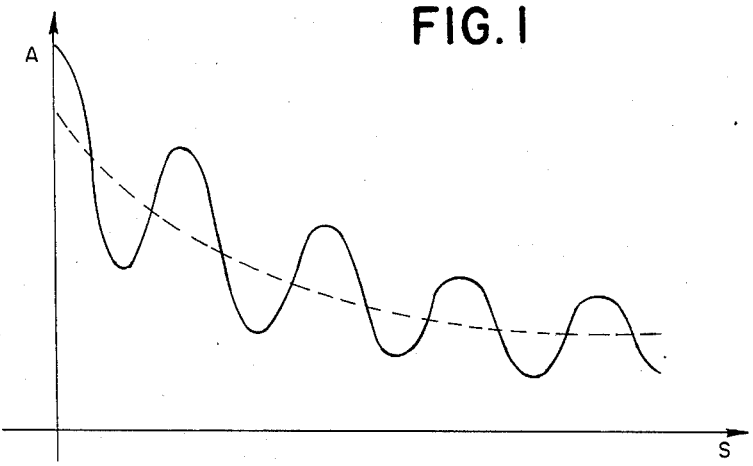
FIG. 1 illustrates the distribution of the intensity of the radio frequency along a given direction.

The apparatus according to the present invention is based on the observation of a physical effect as follows. When electromagnetic waves having a certain frequency, particularly in the radio frequency range, are radiated into the ground, by using a buried antenna and a shielded transmitter in such a manner as not to radiate out of the ground, the radio frequency is distributed on the surface of the ground. In particular, with an omnidirectional antenna the radio frequency is uniformly distributed in all directions. Moreover it should be noted that such distribution is stationary, namely the intensity of wave is not uniformly distributed on the ground, but it shows a sinusoidal distribution (standing wave state). The distribution of intensity along a given direction is generally shown in FIG. 1. The same distribution is obviously obtained along the other directions so that in a fully homogeneous ground, the maxima and minima succeed each other as concentric waves with respect to the transmitting antenna. Such concentric waves are affected with a greater or lesser amount of distortion depending on irregularities present in the ground. It should be noted in this connection that in a steady state, the maxima which are denominated "peaks" and the minima, which are denominated "valleys", follow each other in space as a function of the transmitted frequency, namely the wave length. More precisely, the distance of a peak from a valley is equal to $\lambda/4$ whereas the distance between two peaks (or between two valleys) is equal to $\lambda/2$. Moreover the amplitude of a peak (or valley) follows a decreasing exponential state on going away from the antenna.

Such distribution in a steady state of the radio waves can be explained by the fact that the ground is a high impedence medium for radio frequency and consequently it has a behaviour similar to an unmatched impedence transmission line for radio frequency. Moreover the fact that radio frequency continues to progress in the ground and does not leave it completely at a short distance from the transmitting antenna, can be explained on the basis of the same principle by which a light ray propagating perpendicularly to the thickness of a flat sheet of glass, does not leave the glass itself.

As to such distribution of the intensity of the radio frequency wave on the ground, a field measurement device has been provided comprising a particular radio receiver tuned to the transmitter and having an instrument for measuring the intensity of the wave to which it is tuned. The measurement device is provided moreover with a particular antenna formed with a dipole contained in a metal box which is closed excepting for one face, namely that which has to be laid on the ground. In such a condition, the antenna can perceive only the radio wave coming from the surface of the ground. By the above apparatus it has been shown by experimental tests that when the transmitting and receiving antennas have been placed at a certain distance one from the other, rather than detecting a constant value (depending on the distance) of the intensity of the electromagnetic waves transmitted into the ground, a variation of intensity directly proportional to the speed of motion of a body in contact with the ground is perceived, even at a range of one hundred meters from the receiving antenna.

Additionally it was experimentally verified that:
(a) perception of the motion does not depend on the ground orography: tests with similar results were carried out on woody hill and flat ground;
(b) perception of the motion is not bound to the fact that the moving body is placed between the transmitting antenna and the receiving antenna: in some tests the transmitting and receiving antennas were placed at a distance of several meters, whereas the moving body was at about fifty meters, the same result having been obtained;
(c) perception of the motion is substantially omnidirectional, excepting what has been stated previously and noting that, theoretically, an antenna capable of transmitting in one or more preferential directions can be used;
(d) perception of the motion does not depend on how the object is moving on the ground, albeit the system becomes insensitive below a certain physical size, for instance that of a small animal;
(e) the parameter which is displayed by the field measurement device is the radio frequency intensity in the measurement point, namely where the receiving antenna is set. The variations observed in the radio frequency intensity in the presence of a body in motion do not depend on a general attenuation of the radio frequency itself, but on a different distribution of peaks and valleys in the steady state.

As to the range of such a system it has been shown that it is a function both of the transmitter power and the receiver sensitivity and moreover it is probably a function of frequency and arrangement of the receiving antenna with respect to the transmitting antenna. Additionally it depends on the kind of ground and particularly its humidity.

Figure 2:
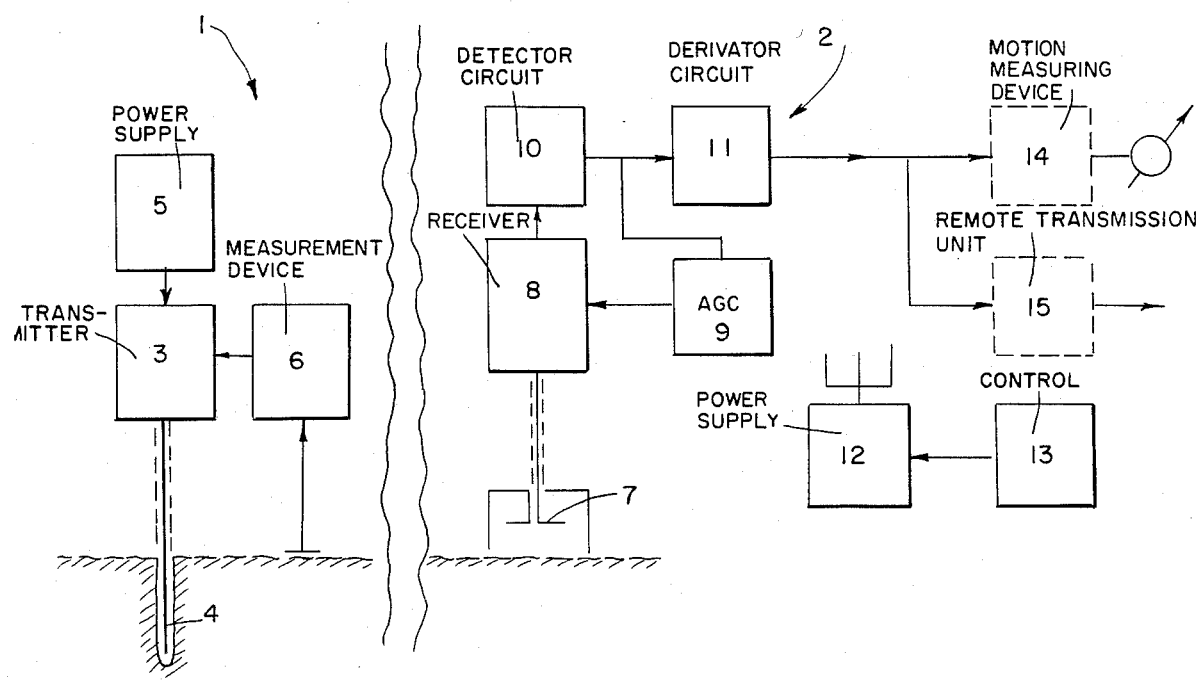
FIG. 2 shows a block diagram of the apparatus according to the present invention.

Referring to FIG. 2, the apparatus according to the present invention comprises a transmitter unit generically indicated in 1 and a receiver unit generically indicated in 2, which are placed at a known distance one from the other. The transmitter unit 1 comprises a high efficiency semiconductor continuous wave transmitter 3 having a fixed frequency, possibly provided with switching on devices operated by a conventional control (switch, remotecontrol and the like). In particular, the transmission frequency of the electromagnetic wave is 200 MHz. The transmitter 3 which is suitably shielded in order not to irradiate outside the ground, is connected to a transmitting antenna 4 of half-wave dipole or stile type, resonating at ¼ wave, which can be laid in an insulating container to be buried. The antenna 4 is conveniently tuned at the frequency of transmitter 3.

The transmitter unit 1 can be fed, as shown in the illustrated embodiment, by means of an accumulator power supply 5, which can be provided with a solar cell recharging device (not shown). In a modification the unit can be directly fed from the mains. Advantageously it can additionally be provided with a measurement device 6 for measuring the ground humidity, which is connected to the transmitter 3 in order to control the amplitude of the output signal as a function of humidity.

The receiver unit 2 comprises a receiving antenna 7, a dipole for example, tuned at the transmitter frequency, which is out of the ground and fully shielded with respect to the air. To this end it can be closed in a metal container which is open only on its side facing the ground. The antenna 7 is connected to a receiver 8 (heterodyne for example), tuned to the frequency of transmitter 3 and provided with an automatic gain control (AGC) circuit 9 for automatically adjusting the sensitivity of the receiver to an average level of the input signal. Particularly this circuit acts to compensate for slow variations in the signal due to the humidity of the ground and other factors. This circuit is conventionally provided with a desired time constant in order to react only to slow variations of signal and not to fast variations due to the presence of bodies in motion. The receiver unit 3 also comprises a circuit 10 for detecting a variation in the input signal, which drives the AGC circuit 9 and comprises a derivator circuit 11 for discriminating in the detected signal the fast variations due to bodies in motion from slow variations due to physical effects of the ground, such as humidity and the like. Unit 3 is provided moreover with an accumulator power supply 12, which can be recharged by means of a solar cell (not shown), or as a modification it can be directly connected to the mains, when accessable. It is moreover provided with a device 13, such as a remote-control, for switching on the unit 2.

Advantageously the receiver unit 2 can be provided with a local device for measuring or indicating the motion, as well as a circuit for the remote transmission of the motion data, both being illustrated in FIG. 2 by a dashed line and indicated with 14 and 15 respectively.

The transmission frequency may be not fixed, but variable according to a pre-established program in order to avoid possible disturbing interferences. In particular the variation range of frequency can be chosen taking into account that too high a frequency requires a correspondingly high power, whereas with a low frequency the sensitivity of the apparatus could be considerably reduced. Electromagnetic waves of a frequency from 0.3 to 900 MHz can be reasonably used according to the present invention on the basis of the above referred considerations. The wave may also not be a continuous, but a pulsed or coded wave to avoid possible interferences. In such a case the transmitter unit 2, as well as the receiver unit 3, comprise conventional coding and decoding circuits.

The receiver unit can be placed at any distance from the transmitter, however within the range of action of the apparatus. A plurality of receiver units can be used in connection with one transmitter unit or vice versa, one receiver unit can operate sequentially with a plurality of transmitters, or even a plurality of transmitters can operate sequentially with a plurality of receivers.

Particularly in this case, it is possible on the basis of analysis and comparison of the information given to the various receiver units, also to obtain information about the position of the body in motion. To this end the detected data are supplied to a programmed processor.

Modifications to the illustrated embodiment of the apparatus can be envisaged within the scope of the present invention.

I claim:

1. Apparatus for detecting a body in motion on the ground of a protected area, comprising:
   (a) transmitter means for transmitting radio frequency elctromagnetic signals including at least a fully buried transmitting antenna, shielded for inhibiting a radio frequency radiation in the air;
   (b) receiver means for receiving said signals including at least a receiving antenna fully shielded to the air and placed at a known distance from said transmitter means;
   (c) automatic gain control means coupled to said receiver means for adjusting the sensitivity thereof to an average level of an input signal;
   (d) detector means for detecting amplitude variations of the input signal, for driving said automatic gain control means and for discriminating fast variations due to a body in motion on the ground from slow variations due to physical effects in the ground.

2. Apparatus according to claim 1, wherein said electromagnetic signals comprise a continuous wave.

3. Apparatus according to claim 2, wherein said electromagnetic signals have a coded variable frequency.

4. Apparatus according to claim 3, wherein the frequency range of said signals is 0.6 to 900 MHz.

5. Apparatus according to claim 2, wherein said electromagnetic signals have a coded fixed frequency.

6. Apparatus according to claim 5, wherein said electromagnetic signals have a radio frequency of 200 MHz.

7. Apparatus according to claim 1, wherein said transmitting antenna is a half-wave dipole stile.

8. Apparatus according to claim 1, wherein said detector means comprise a derivator circuit for discriminating in the detected signal fast variations due to bodies in motion from slow variations due to physical effects of the ground.

9. Apparatus according to claim 1, wherein said electromagnetic signals are coded, said transmitter means comprising a signal coding circuit, and said receiver means comprising a signal decoding circuit.

10. Apparatus according to claim 1, wherein said transmitter means comprise a plurality of transmitting antennas.

11. Apparatus according to claim 10, wherein said transmitting antenna is omnidirectional.

12. Apparatus according to claim 10, wherein said transmitting antenna is directional and comprises an assembly of elementary antennas.

13. Apparatus according to claim 1, wherein said receiver means comprise a plurality of receiving antennas.

14. Apparatus according to claim 1, further comprising processor means for an analysis and comparison of the data detected in reception.

15. Apparatus according to claim 1, further comprising power supply means for said transmitter and receiver means.

16. Apparatus according to claim 1, further comprising means for remote transmission of the detected data.

17. Apparatus according to claim 1, including a measurement device for measuring the humidity level of the ground connected to said transmitter means to adjust the amplitude of the output signal from said transmitter means responsive to the measured humidity.

* * * * *